United States Patent Office 3,827,878
Patented Aug. 6, 1974

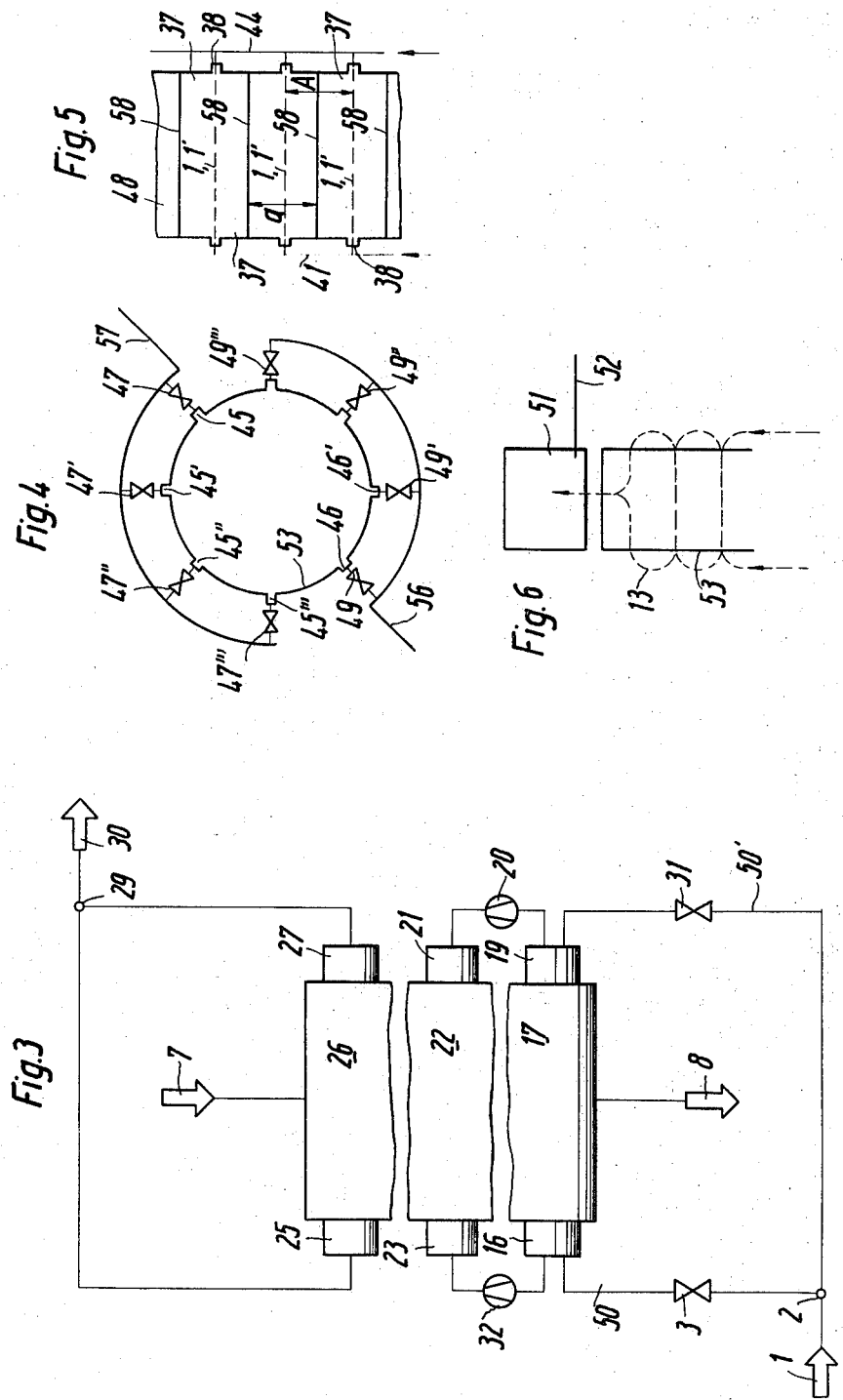

3,827,878
METHODS AND APPARATUS FOR THE REDUCTION OF METAL ORES, PARTICULARLY IRON ORES
Werner Wenzel, Mohammed Meraikib, and Friedrich H. Franke, Aachen, and Horst Konig, Duisburg, Germany, assignors to Demag A.G., Duisburg, Rheinische Braunkohlenwerke A.G., Cologne, and Dr.-Ing. Wenzel, Aachen, Germany, fractional part interest to each
Filed June 23, 1972, Ser. No. 265,527
Claims priority, application Germany, June 26, 1971, P 21 31 876.3
Int. Cl. C21b 13/02
U.S. Cl. 75—34  10 Claims

ABSTRACT OF THE DISCLOSURE

Methods and apparatus are provided for reducing metal ores in which the ore is exposed to reducing gases in evenly diffused fashion over the entire cross section of the charge. The above is achieved by the periodic reversal of the flow direction of the reducing gas diffused transversely of the charge direction, by reintroducing already diffused gases back into the charge at points upstream of the charge flow, and by removing the diffused gases at a point upstream of the charge flow from the point at which the gases entered, the latter providing simultaneously a counter-current and transverse flow pattern of reducing gases through the charge. Also provided herewith are means for utilizing spent reducing gases for preheating and pre-drying the charge prior to reduction.

This invention covers methods and apparatus for reducing metal ores, particularly for the production of iron sponge from iron ore in a metallurgical furnace, the charge being fed through the furnace chamber from the infeed end to the delivery end and thereby being exposed to the effect of reducing gases, such as CO and $H_2$, passing mainly in transverse flow to the delivery direction of the reduction charge, and if necessary, under pressure.

In the past, shaft or vertical furnaces have been used for the reduction of iron ores exposing them to reducing gases, such as carbon monoxide and hydrogen, in which furnaces the charge is fed from the top and the reduced material, such as iron sponge, is extracted from the bottom, while fresh reducing gas is injected from below and the spent reducing gas is extracted at the top. A specific disadvantage of these reduction furnaces is the difficulty in obtaining, in large plants with high throughput capacity, a uniform passage of the gas throughout the entire cross section of the furnace shaft of the reduction gas injected through the walls of the lower part of the shaft. The heterogenous passage of gas results in heterogenous reduction in the peripheral and center portions of the furnace, which can result in overheating of the peripheral zone and sintering of the iron sponge produced, while there is insufficient reduction and heating in the furnace center.

Furthermore, a method is known for the reduction of iron ore to iron sponge in a shaft or vertical furnace whereby the reducing gases pass through a central tube provided with gas outlet orifices. Through these orifices the reducing gas is injected into the charge and passes through transversely of the material delivery direction. The disadvantage of this method is that the injection of the reducing gas from the center of the charge load to its peripheral zone is difficult, as the strength and course of the individual gas currents cannot be regulated and they are exposed to constant changes. The apparatus for execution of this known method is complicated in its structure—due to the arrangement of the central tube with gas outlet orifices in the furnace shaft.

One step toward a simplification of the method described would be the elimination of the central tube and leading the reducing gas from one side of the furnace wall to the opposite side. This would, however, enlarge the cross section of the load diffused by the gas such that, due to the high reduction potential of the fresh reduction gases, the reduction effect on the ore at the gas infeed side is substantially higher than at the outlet side. It is the object of this invention to provide a method which avoids the disadvantages of the prior art procedures just described and also facilitates an increase of the cross section of the charge load, while simultaneously allowing complete and uniform reduction of the charge over the entire charge load cross section.

In order to solve this problem, the reducing gases, in accordance herewith, are injected into the reduction charge through one of the furnace walls and then extracted again through the opposite wall, and the direction of the reduction gas flow is periodically changed. The reducing gas is injected into the charge load from one side and extracted from the wall lying opposite the infeed. Then the flow is reversed for an equal period of time, by injecting from the former outlet in the opposite direction into the same or the following charge load at a point where there is a still lower degree of reduction of the charge load. This method ensures a favorable exploitation of the reducing gases by means of a modified counter-current gas flow.

Another characteristic of the invention is that the reduction gas, after passing through the charge to be reduced, is again injected into the charge at a point where the degree of reduction of the charge is less than the degree of reduction of the charge through which the gas passed previously. According to another detail of the invention, the reduction capacity may be substantially increased by adding fresh reducing gas to the reducing gas having passed at least once through the charge being reduced.

It is still another object of the invention to guide the reducing gas successively in varying directions through several zones of the charge to be reduced, with these zones possessing differing degrees of reduction. The reduction method according to known transverse cross flow principles lacks the normally counter-current flow effect between gas and charge, which is effective in the method of the vertical flow through the shaft. One important principle of the method according to the invention is, therefore, that the flow of the reducing gas is injected and extracted in transverse flow of the charge at points offset vertically alongside the furnace chamber. The reducing gases pass through the charge diagonally or at an angle to a horizontal plane through the furnace, so that the gases are injected into the lower part of a shaft or vertical furnace wall into the charge and extracted through a higher part of the opposite furnace wall. After a period of time change of the flow direction takes place and the injection is effected through the lower part of the previous extraction wall and the extraction of the gases through the upper part of the previous injection wall. This results in a counter-current flow in the reducing method combined with transverse flow.

When using a furnace with circular cross section, one form of execution of the invention is to inject and extract the gas flow in radial direction whereby the gas flow direction is intermittently changed in stepped fashion circumferentially around the furnace wall. According to another embodiment of the invention, the desirable counter-current flow of reduction gases is achieved by injecting the gas into a counter-current flow shaft provided with fresh ore after the gas has already passed through a final reduction load in transverse flow. Thus, the charge is pre-reduced in a counter-current flow shaft by means of the exhaust gases from a transverse flow shaft, and then the reduction is completed by transverse flow with fresh reduction gas.

The invention also includes superimposing a pressure pulsation on the periodic change of the flow direction. The pulsation is, for example, achieved by changing the injection pressure by 20% in the period of one second. The reducing conditions may be improved by preheating or drying the metal ore. This can be done by preheating and drying the metal ore to be reduced in a preparatory stage, separate from the furnace, by means of part of the spent reduction gas extracted from the furnace, and burned in air or oxygen.

The methods, in accordance herewith, are enhanced when a direct flow of reduction gas over two furnace levels diffused successively with the same gas is avoided. In order to achieve this goal, the reduction charge may be divided with intermediate layers of gas-tight material into layers the thickness of which is generally the same as the space between two adjacent injected gas flows along the side of the furnace. This avoids short-circuiting or intermingling of the different levels of injected gas flows. The intermediate layers run mainly transverse to the direction of motion of the charge.

Thus, when using a vertical shaft where the ore to be reduced sinks from top to bottom continuously or discontinuously, thin horizontal layers of fine ceramic material of about 20 cm. thickness can be introduced into the charge, when levelling the ore discharge hoppers in the shaft. Accordingly, the layers sink with the charge. In order to form the intermediate layers, a material can be used that is useful in the process, such as fine iron ore or a desulphurizing agent such as lime or dolomite. An undesirable intermingling flow of the separate reduction gas charges can also be avoided by inserting sheet metal or ceramic or other plates between the individual adjacent charge loads. The plates can be inserted suitably spaced into the charge and sink down with the charge. Particularly suitable are plates of fine iron ore with an appropriate binding agent. The thickness of such plates are a few centimeters.

The method according to the invention can be effected in a furnace, especially in a shaft furnace, formed by a shell encasing a furnace chamber, which shell is provided with gas inlet and outlet nozzles leading into the furnace chamber which are connected to a pipe system fed with reduction gas. The furnace is characterized by the fact that each nozzle can be connected selectively either to the gas inlet or outlet tube of the pipe system.

When using a transverse gas flow furnace, another detail of the invention provides for a pre-reduction furnace attachment preceding this transverse flow furnace, which attachment operates on the counter-current flow principle, and includes a vertical shaft and is preferably arranged coaxially with the transverse flow furnace, whereby the outlet pipe for the reduction gas leaves the transverse flow part of the furnace and enters the furnace attachment. The charge fed into the shaft goes first through the counter-current flow stage, then through the transverse flow stage diffused by a gas flow with alternating direction, and is finally extracted at the bottom of the shaft as iron sponge.

When using a furnace with circular cross section, the invention provides gas inlet and outlet nozzles respectively arranged circumferentially around the furnace shell with the nozzles on each side connected in opposed relation with a gas infeed and gas discharge pipe respectively, successively in a given direction. Thereafter, the opposed sets of nozzles can be connected in reverse fashion to the gas discharge and gas infeed pipes respectively, with this reverse connecting taking place intermittently over a period of time. Another aspect of the invention includes attaching to the reduction furnace a drying chamber connected to a source of oxygen or air, into which the reduction gas pipe coming from the reduction furnace enters. The invention is illustrated in the following examples. It is to be understood, however, that these examples are being presented with the understanding that they are to have no limiting character on the broad disclosure of the invention as generally set forth herein and as directed to men skilled in the art.

EXAMPLE 1

A test transverse gas flow furnace with a diffusible charge area of 1 m. (meter) wide was fed with hematite ore of 3-10 mm. grain size. From a vertical wall of the shaft furnace a reduction gas was fed into the ore grain with empty-pipe-speed of approximately 1 m./second, with a composition of 50% CO and 50% $N_2$. The gas inlet temperature was 1,000° C. The gas was extracted from the opposite furnace wall. After a four hour test period, the following reduction degrees of the ore are found as a result of the distance of sampling from the gas inlet side:

| | Reduction degree, percent |
|---|---|
| At the gas inlet wall | 97 |
| ¼ distance of shaft width from inlet point | 95 |
| ½ distance of shaft width from inlet point | 50 |
| ¾ distance of shaft width from inlet point | 40 |
| At gas outlet | 30 |

EXAMPLE 2

The same kind of ore as in example 1 was used in the same reduction furnace under the same conditions and reduced with the same reduction gas. After a reduction period of 15 minutes each, the gas direction was reversed. The entire period of reduction also amounted to four hours. According to the method of the invention, the following results with respect to the reduction gas in the charge were found, again measured as result of the distance from the gas inlet side (same gas inlet side as in example 1):

| | Reduction degree, percent |
|---|---|
| At gas inlet wall | 93 |
| ¼ distance of shaft width from inlet point | 91 |
| ½ distance of shaft width from inlet point | 88 |
| ¾ distance of shaft width from inlet point | 90 |
| At gas outlet | 91 |

This shows that the method in accordance with the invention in a cross flow furnace results in a substantially more balanced reduction effect.

The apparatus for execution of the invention is described in detail by the attached drawings.

FIG. 3 shows a combined reduction furnace in axial section operating on a vertical as well as transverse flow principle;

FIG. 4 shows a scheme of a revolving furnace in cross section;

FIG. 5 shows part of the charge shaft of a shaft furnace in axial section; and

FIG. 6 shows a reduction furnace with a pre-drying attachment.

Figure 1:
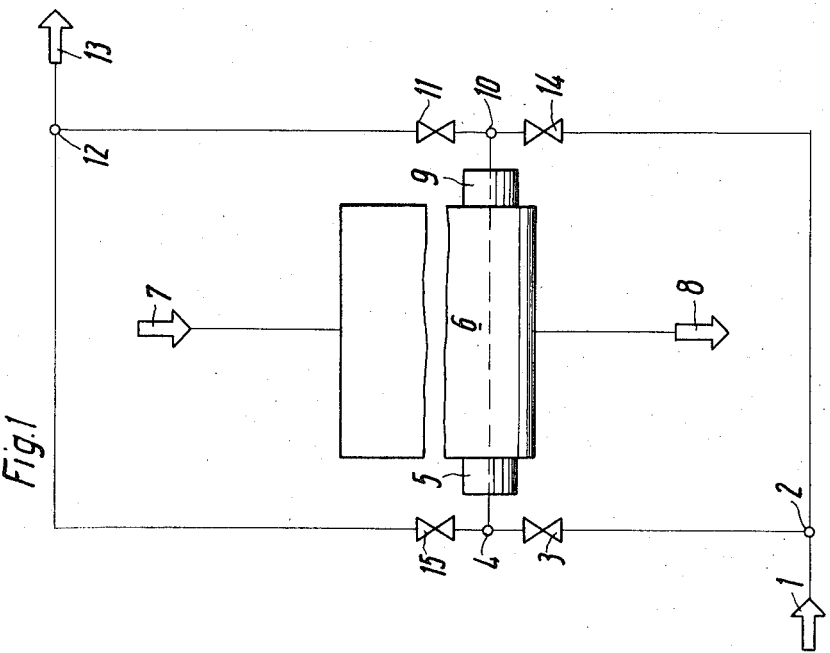
FIG. 1 shows a reduction furnace in axial section operating on a simple transverse flow principle.

In FIG. 1, 1 indicates the reduction gas fed in, 2, 4, 10 and 12 indicate gas pipe branches; 3, 11, 14 and 15 indicate valves; 5 and 9 indicate lateral gas nozzles for the gas inlet and outlet respectively. The vertical reduction shaft 6 is supplied with charge 7 and iron sponge 8 is discharged. During the first time phase the reducing gas 1 passes through pipe branch 2, via open valve 3, while valves 14 and 15 are closed, through pipe branch 4 and nozzle 5 and enters reduction shaft 6. The gas passes through nozzle 9 and branch 10 and leaves the reduction shaft 6 via open valve 11 and branch 12 as "gas after reduction" 13.

During the second time phase, after switching valves 3, 11, 14 and 15, the reduction gas 1 is injected into nozzle 9 through pipe branch 2, while valve 14 is open and valves 3 and 11 are closed. The gas passes through shaft 6 transversely of the flow direction of the charge to be reduced and leaves through nozzle 5. From there the gas passes as gas after reduction 13, with valve 3 being closed, via branch 4 and open valve 15, and leaves the furnace through pipe branch 12. The flow direction of the reduction gas alternates periodically. The effect of the change can be heightened by imposing pressure pulsation in inlet line 1.

Figure 2:
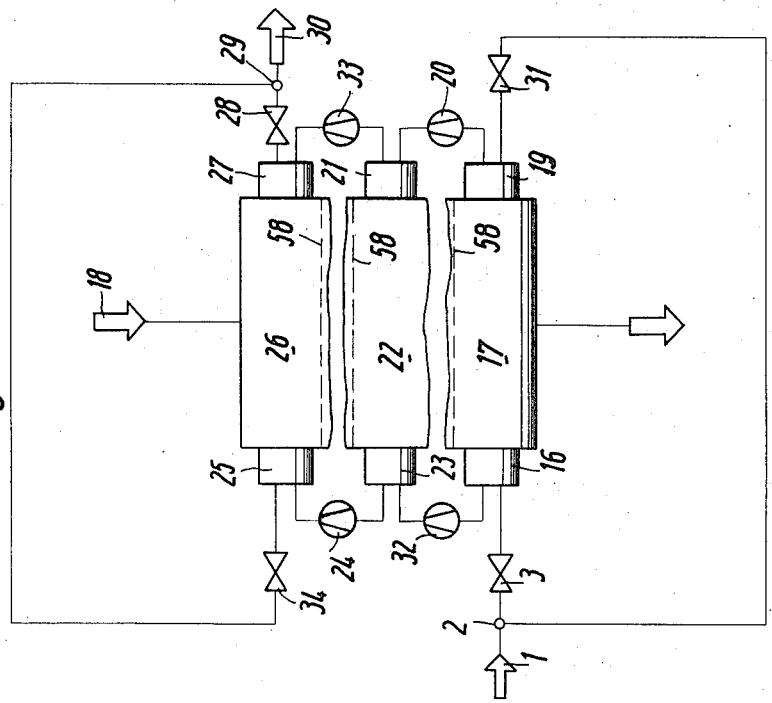
FIG. 2 shows a reduction furnace in axial section operating on a multi-stage transverse flow principle.

The apparatus shown in FIG. 2 operates on the multi-stage transverse flow principle with change in flow direction. 2 and 29 indicate gas pipe branches. 3, 28, 31, and 34 indicate valves. 20, 24, 32 and 33 indicate gas propulsion fans. 16, 19, 21, 23, 25 and 27 indicate gas nozzles. The charge is divided into substantially horizontal layers 17, 22 and 26 by means of gas-tight intermediate layers 58 of fine grain ceramic material, fine iron ore or lime or dolomite. The intermediate layers can also consist of sheet metal. During the first time phase of the reduction process, the reducing gas 1 is led through branch 2, with open valve 3 and closed valve 31, through nozzle 16 into the charge load 17 located in the lower part of the shaft.

The gas leaves the lower part of the shaft through nozzle 19 and is fed into the charge load 22 located in the center shaft section by means of fan 20 through nozzle 21. After passing through this layer, the gas is extracted from the shaft through nozzle 23. After passing fan 24 it enters nozzle 25. In the upper shaft section 26 the gas serves to pre-reduce the iron ore 18. It then leaves the upper shaft section via nozzle 27, with open valve 28, through branch 29 as gas 30 after reduction, while valve 34 is closed. During the second phase, reduction gas 1 is fed into the charge load 17 in the lower shaft section through gas pipe branch 2 with open valve 31 and closed valve 3 via nozzle 19. The reduction gas leaves charge load 17 via nozzle 16 and is injected through fan 32 via nozzle 23 through layer 22 into nozzle 21, which is connected to fan 33. Via nozzle 27 the gas passes through the upper charge load 26, while valve 28 is closed. From here it is fed via nozzle 25, with valve 34 being open, to pipe branch 29. From there it leaves the furnace as gas 30 after reduction.

With the arrangement of FIG. 2, and without nozzles 21 and 23 as well as without fans 20, 24, 32 and 33, the reducing gases are fed through the charge, both transversely and counter-currently, namely from nozzles 16 and 19 respectively located at the inlet end of the reduction shaft to nozzles 27 and 25 respectively, located at the opposite outlet end. After shifting the gas flow direction, the charge is diffused from nozzle 25 and 27 respectively towards nozzle 19 and 16 respectively. A prerequisite for this procedure is that the entire charge layer which is diffused transversely, be of uniform quality.

FIG. 3 shows a shaft furnace diffused vertically in its upper part, its lower part being diffused in alternating flow direction according to the transverse flow principle. 2 and 29 indicate gas pipe branches. 3 and 31 are valves. 20 and 32 refer to fan devices. 16 and 19 are the nozzles at the lower reduction shaft area. 21 and 23 indicate the nozzles at the center part of the furnace, 27 and 25 are the nozzles for gas inlet and outlet respectively to or from the upper shaft section, which is supplied with iron ore 7. Iron sponge 8 leaves the shaft through the lower shaft section. During the first time phase, reduction gas 1 enters charge load 17 located in the lower shaft section, through branch 2, with valve 3 being open and valve 31 being closed, via nozzle 16. The gas leaves the lower shaft section via nozzle 19 and enters nozzle 21 by means of fan 20. Through the center shaft section it passes in vertical direction into the upper shaft section containing charge load 26, and from there it leaves the shaft as gas 30 after reduction via nozzles 25 and 27 and branch 29.

During the second time phase, the reduction gas 1 enters nozzle 19 through branch 2, while valve 31 is open and valve 3 is closed. After passing through charge load 17 in the lower shaft section, the reduction gas reaches charge load 22 via nozzle 16 by means of fan 32 and via nozzle 23. From here the gas flows vertically to charge load 26, and from there it leaves the furnace as gas 30 after reduction via nozzles 25 and 27 and branch 29. Accordingly, charge 7 introduced into the reduction process is, therefore, pre-reduced in the upper shaft sections in countercurrent flow by means of the reduction gas previously sent through the charge transversely.

The furnace referred to in FIG. 4 as 53 is provided with gas inlet and outlet nozzles 45 and 46 respectively arranged on the same level at the furnace circumference; these gas inlet and outlet nozzles respectively are connected to two separate gas pipes 56 and 57 via valves 47 and 49 respectively. The reduction gas enters the charge load via gas pipe 57 and open valve 47', with valves 47, 47'', 47''', 49'' and 49 being closed, whereby the opposite valve 49' is open. The reduction gas then flows diametrically through the charge and leaves the furnace through gas outlet orifice 49'. During the second time phase, valves 47'' and 49'' are open; all other valves are closed. During the following time phase, each of the valves arranged opposite each other are open in succession, while all other valves remain shut. After shifting the flow direction in pipes 56 and 57, the gas flow is reversed. This method results in a uniform reduction over the entire cross section of the charge.

FIG. 5 shows horizontal charge layers 37 in vertical shaft 48. Individual charge layers are separated from each other by gas-tight intermediate layers 58. 41 and 44 indicate two pipes of a system fed with reduction gas. 38 refers to gas inlet and outlet nozzles, which can be connected optionally to pipes 41 and 44, which serve alternately as gas infeed and gas exhaust pipes. The flow of the reduction gas is designated by 1 and 1' respectively. As may be seen, the distance A between two adjacent parallel gas flow inlets in the furnace corresponds to the distance $a$ of two adjacent intermediate layers 58, confining layers 37.

FIG. 6 shows a separate preparatory stage preceding reduction furnace 53, which stage consists of a drying chamber 51 arranged coaxially to furnace 53, and which includes an oxygen or air supply line 52. The reduction gases 13 extracted from furnace 53 are burnt with oxygen in drying chamber 51, and the combustion heat is used to pre-dry and preheat the entering ore 7, which is to be reduced.

In general, the transverse flow principle, with periodically changing flow direction disclosed hereinabove, may be used for treatment of lumpy material, pellets or agglomerates in shaft or vertical furnaces, particularly lime kilns, dolomite kilns, pellet shaft kilns, and the like, as well as in the chamber retort process, where the charge to be treated is exposed to the effect of hot gases flowing mainly transversely of the longitudinal axis of the furnace shaft.

This method can furthermore be applied to revolving furnaces with two furnace walls and tunnel furnaces respectively arranged inside each other, through which the reduction charge can be transported on conveyors.

While the methods and apparatus herein disclosed form preferred embodiments of this invention, this invention is not limited to those specific methods and apparatus and changes can be made therein without departing from the scope of this invention, which is defined in the appended claims.

What is claimed is:

1. In a method of reducing iron ores traveling in a predetermined longitudinal path through a furnace by subjecting the ores to moving streams of reducing gases, the improvement including the steps of (a) establishing a predetermined charge body of ore having a predetermined cross-sectional shape and a predetermined thickness;

(b) establishing a flowing stream of reducing gas in an initial direction transverse of said path;

(c) subjecting said charge body to an initial exposure of predetermined duration to said stream of reducing gas, said gas when traveling through said body in said initial direction entering at a predetermined entry point on a first side of said charge body and exiting at a predetermined exit point on a second side of said charge body opposite to said first side;

(d) reversing said initial direction of flow of the reducing gas to a secondary direction of flow opposite to said initial direction;

(e) thereafter subjecting said charge body to a secondary exposure of predetermined duration to said reversed stream of reducing gas, said gas when traveling through said charge body in said secondary direction reentering said body at said aforementioned second side and exiting at said aforementioned first side;

(f) periodically, sequentially repeating steps (b) through (e) to subject said charge body to multiple cyclical reversals of direction of said reducing gas flowing therethrough to effect a complete and uniform, substantially homogeneous reduction of said charge body throughout its cross section.

2. The method of claim 1, in which
(a) said initial and secondary exposures are of substantially equal durations.

3. The method of claim 1, in which the reducing gas is reentered into the charge to commence said secondary exposure at a point upstream of the charge body path from the exit point of said first exposure, at which upstream point the degree of reduction of the charge is less than the degree of reduction of the charge at said exit point.

4. The method of claim 1, in which a pressure pulsation is superimposed on the periodic changes of the flow direction of said reducing gas.

5. The method of claim 1, in which fresh reducing gas is added to the flowing reducing gas after said flowing gas has traveled through said charge body at least once.

6. The method of claim 1, in which (a) said charge body cross section is circular and said charge body path is vertical;

(b) said reducing gas is injected into and extracted from said charge body sequentially at a plurality of diametrically opposed points circumferentially around said charge perimeter.

7. The method of claim 6, characterized by the fact that the reducing gas, after having passed through said charge body in transverse flow, is directed along said vertical path opposite to the direction of travel of said charge body to pretreat a fresh charge body.

8. The method according to claim 1, in which the reducing gas enters and exits the charge body for transverse flow therethrough at points spaced longitudinally of said charge body path.

9. The method of claim 8, in which
(a) said charge body includes several zones;
(b) said reducing gas is guided successively through said zones in the order of least degree of reduction of the ore therein.

10. The method of claim 9, in which
(a) the charge body is divided into layers by intermediate strata of gas-tight material, the thickness of which layers is not greater than the spacing between two successive points of injection along said longitudinal path;
(b) said intermediate strata are selected from the groups consisting of fine iron ore, lime, dolomite, sheet metal and ceramic material.

References Cited
UNITED STATES PATENTS

| | | | |
|---|---|---|---|
| 431,864 | 7/1890 | Adams | 75—34 |
| 1,588,217 | 6/1926 | Winkelman | 75—34 |
| 2,528,552 | 11/1950 | Royster | 75—35 |
| 1,864,593 | 6/1932 | Gustafsson | 75—34 |
| 2,243,110 | 5/1941 | Madaras | 75—91 |
| 2,000,171 | 5/1935 | Gronningsaeter | 75—82 |
| 2,389,133 | 11/1945 | Brassert et al. | 75—34 |

L. DEWAYNE RUTLEDGE, Primary Examiner

M. J. ANDREWS, Assistant Examiner